United States Patent [19]
Langan et al.

[11] Patent Number: 6,058,463
[45] Date of Patent: May 2, 2000

[54] PAGED MEMORY DATA PROCESSING SYSTEM WITH OVERLAID MEMORY CONTROL REGISTERS

[75] Inventors: John Adolphe Langan, Austin; Roberto Manuel Frontera, Driftwood; Claire Ann Schlosser, Austin, all of Tex.

[73] Assignee: Motorola, Inc., Schaumburg, Ill.

[21] Appl. No.: 09/009,509

[22] Filed: Jan. 20, 1998

[51] Int. Cl.[7] .............................. G06F 12/08; G06F 12/10; G06F 12/12; G06F 12/00; G06F 13/00

[52] U.S. Cl. ......................... 711/202; 711/209; 711/206; 711/203; 711/103

[58] Field of Search ................................. 711/103, 104, 711/202, 203, 209

[56] References Cited

U.S. PATENT DOCUMENTS

| | | | |
|---|---|---|---|
| 4,511,964 | 4/1985 | Georg et al. ............................. | 364/200 |
| 5,095,420 | 3/1992 | Eilert et al. ............................. | 395/400 |
| 5,394,537 | 2/1995 | Courts et al. ............................ | 395/425 |
| 5,603,011 | 2/1997 | Piazza .................................. | 395/497.01 |

OTHER PUBLICATIONS

"MC68HC912B32 Technical Summary," Motorola Semiconductor Technical Data, Rev. 1; pp. 1–8, 20–31, 37–51; 1997.

*Primary Examiner*—John W. Cabeca
*Assistant Examiner*—Brian R. Peugh

[57] ABSTRACT

A data processing system has a CPU (12) that accesses memory (16–18) through a memory management interface (14). The memory management interface (14) supports paging of modules of nonvolatile memory (16) into a defined paged memory area in the memory map. Memory control registers (80–87) to control programming and erasing of the modules of nonvolatile memory are simultaneously mapped into the memory map at a defined memory register area, wherein a page (90–97) of nonvolatile memory and its associated memory control registers (80–87) are selected and mapped into their respective defined areas in the memory map based on a single page select register (44).

9 Claims, 9 Drawing Sheets

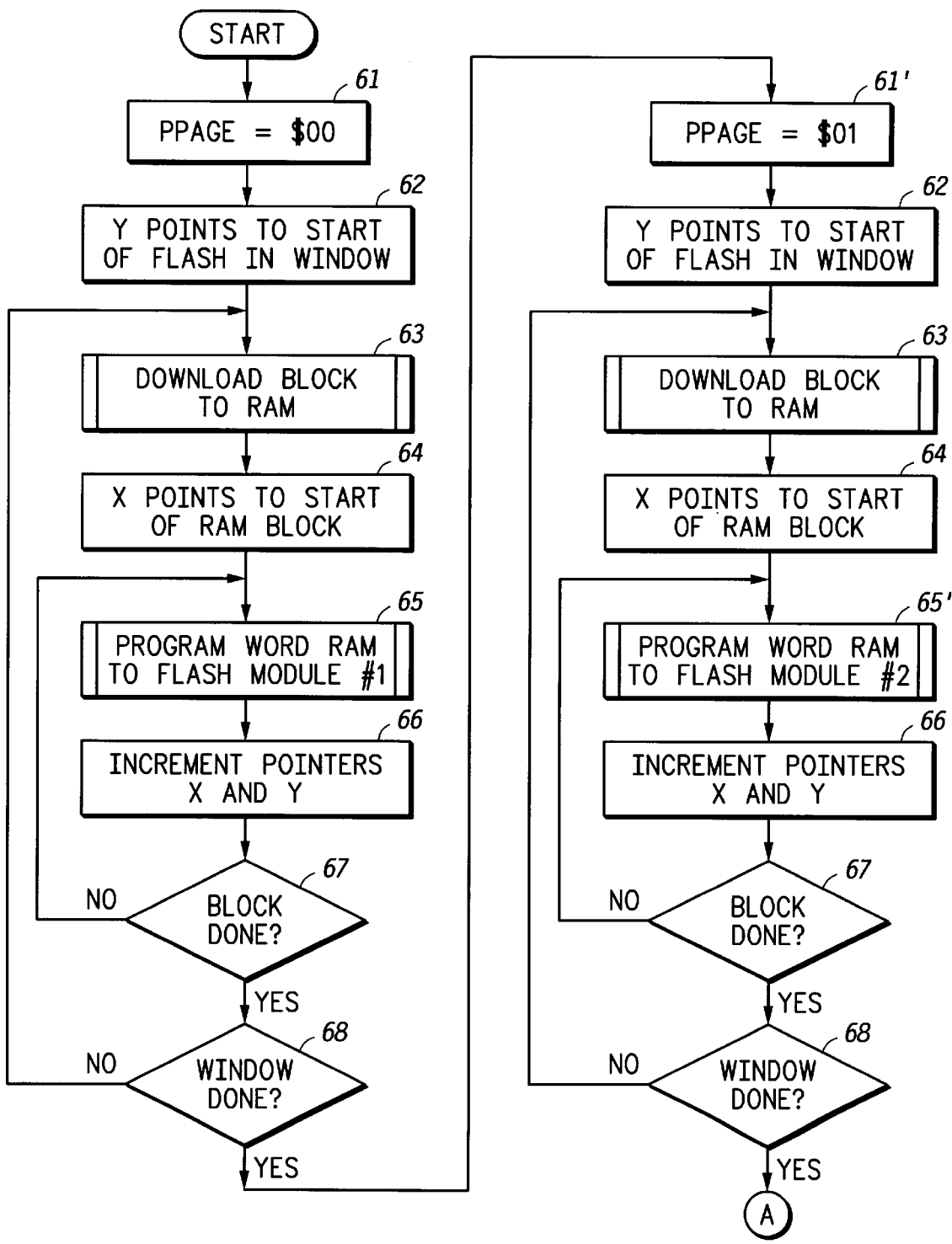
FIG. 4-A
—PRIOR ART—

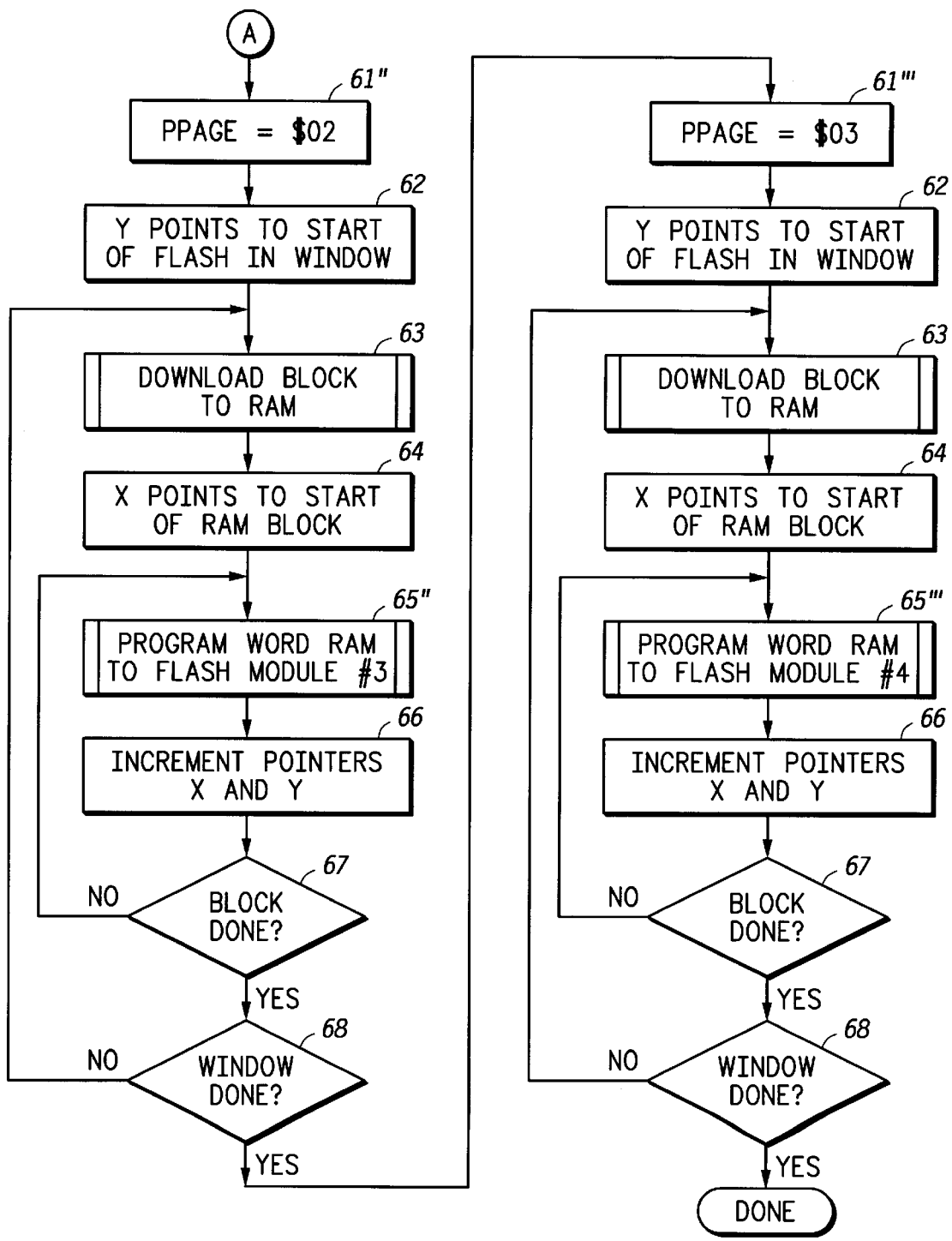
FIG.4-B
—PRIOR ART—

PAGED MEMORY DATA PROCESSING SYSTEM WITH OVERLAID MEMORY CONTROL REGISTERS

FIELD OF THE INVENTION

The present invention generally relates to data processing systems, and more specifically to paged data processing systems with programmable memory.

BACKGROUND OF THE INVENTION

FIG. 1 is a block diagram illustrating a typical microcontroller or microprocessor system. The system 10 has a central processing unit (CPU) 12 that communicates with a memory management interface 14 on a bidirectional bus. The memory management interface (MMI) 14 in turn communicates under direction of the CPU 12, with FLASH 16, RAM 17, and EEPROM 18 memories, on bidirectional buses.

FIG. 2 is a diagram illustrating a typical memory address map of physical memory and registers in the system illustrated in FIG. 1. The memory address map 20 is a programmer's view of the memories 16, 17, 18 shown in FIG. 1. It is controlled by the memory management interface 14. Along the left-hand axis of the memory address map is a series of hexadecimal byte addresses running from $0000 at the top through $FFFF at the bottom for a 64 kilobyte (KB) address range. In low memory are registers and RAM 22. This is followed by EEPROM 24. Starting at hex $4000 is a fixed map FLASH 28 followed by paged FLASH 30, 31, 32, 33, 34, 35, 36, 37 followed by another bank of fixed mapped FLASH 38 starting at hex $C000 and extending up to $FFFF. The second fixed map FLASH 38 contains interrupt and reset vectors. In FIG. 2, eight pages of paged FLASH 30, 31, 32, 33, 34, 35, 36, 37 are shown, each sharing the same address base ranging from $8000 through $BFFF.

FIG. 3 is a diagram illustrating a page mapping scheme for programmable memory utilized in the prior art. Four memories 50, 51, 52, 53 share the address space from $8000 through $BFFF. Each of the four memories 50, 51, 52, 53 has a corresponding set of address registers 40, 41, 42, 43 located at addresses $00F0 through $00FF. There is also a page select register (PPAGE) 44 utilized to select one of the pages of memory 50, 51, 52, 53: when the page select register 44 contains a value of $00, the first memory 50 is selected; when the page select register 44 contains a value of $01, the second memory 51 is selected; when the page select register 44 contains a value of $02, the third memory 52 is selected; and when the page select register 44 contains a value of $03, the fourth memory 53 is selected. The first set of registers 40 starting at address $00F0 is utilized to program the first memory 50. The second set of registers 41 starting a $00F4 is utilized to program the second memory 51. The third set of register 42 starting at $00F8 is utilized to program the third memory 52. Finally, the fourth set of registers 43, starting at $00FC is utilized to program the fourth memory 53.

FIGS. 4A and 4B together form a flow chart that illustrates programming four modules of FLASH memory in an architecture with a limited set of registers, utilizing the prior art architecture. The algorithm starts by setting the page select register (PPAGE) 44 to a value of $00, step 61. Register Y is then set to point at the start of FLASH memory in the window, step 62. An outer loop is then entered, starting with downloading a block to RAM, step 63. This is followed by setting an X register to the start of the RAM block, step 64. An inner loop is then entered which starts by programming word RAM to a first FLASH page (PPAGE=$00), step 65. The X and Y registers are then incremented, step 66, and a test is made whether the block is complete, step 67. As long as the block is not complete, step 67, the inner loop is repeated, starting with step 65. Otherwise, a test is made whether the window is done, step 68. As long as the window is not done, step 68, the outer loop is repeated, starting with step 63. Otherwise, when the window is done, step 68, programming for the first page of FLASH is complete. This is followed by identical code for pages $01 51, $02 52, and $03 53. Note that the page programming has been duplicated four times. This is primarily due to the fact that each of the four memory modules 50, 51, 52, 53 have a corresponding set of registers 40, 41, 42, 43. Therefore, the first set of memory programming registers 40 is used to program the first memory 50, and the second set of memory programming registers 41 is used to program the second memory 51, etc. It would be advantageous to reduce the overhead in programming, as illustrated in FIG. 4. Using a program register 40, 41, 42, 43 corresponding to each memory 50, 51, 52, 53 results in an inefficient programming module.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIGS. 4A and 4B together form a flow chart that illustrates programming four modules of FLASH memory in an architecture with a limited set of registers, utilizing the prior art architecture;

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. Details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. Hexadecimal values have been shown in the specification and drawings as prefixed by a dollar sign ("$"). Thus, $000F represents the hexadecimal value of "F", which is equivalent to a decimal value of 15.

Figure 1:
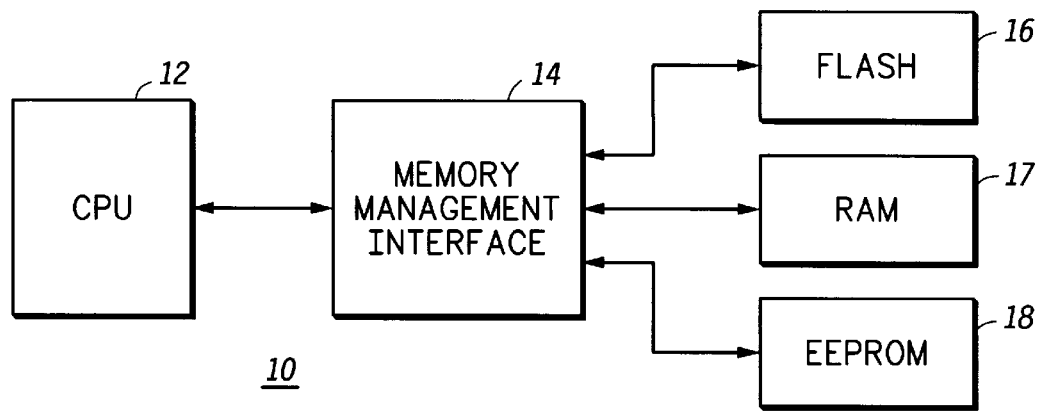
FIG. 1 is a block diagram illustrating a typical microcontroller or microprocessor system.
Figure 2:
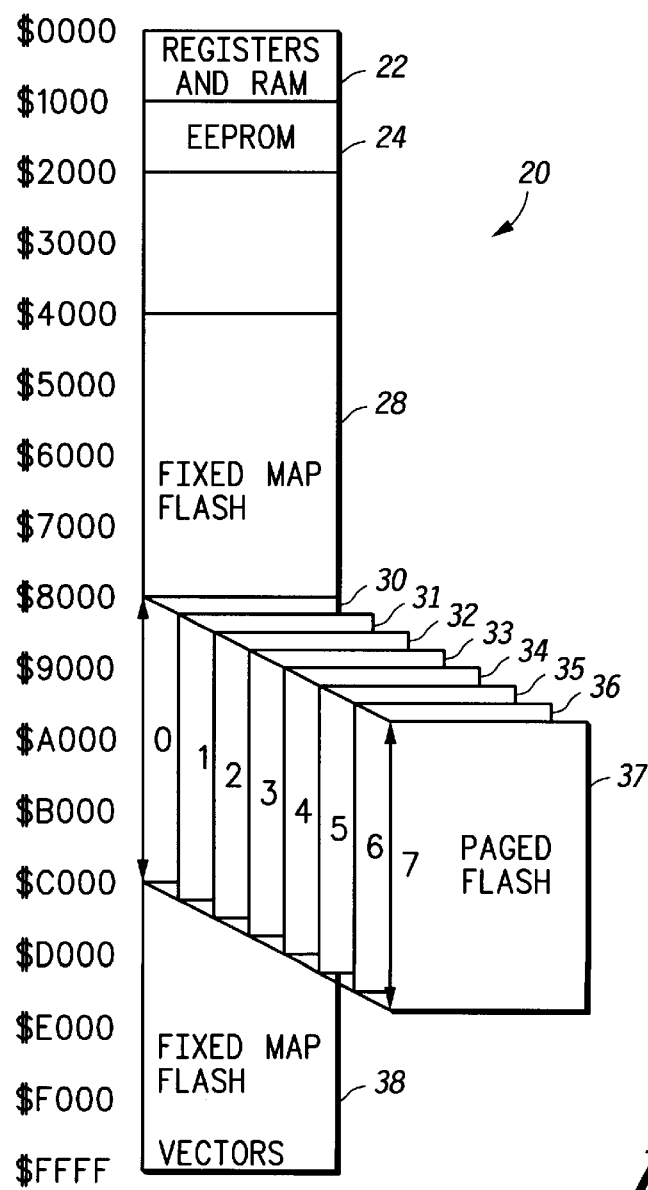
FIG. 2 is a diagram illustrating a typical memory address map of physical memory and registers in the system illustrated in FIG. 1.
Figure 3:
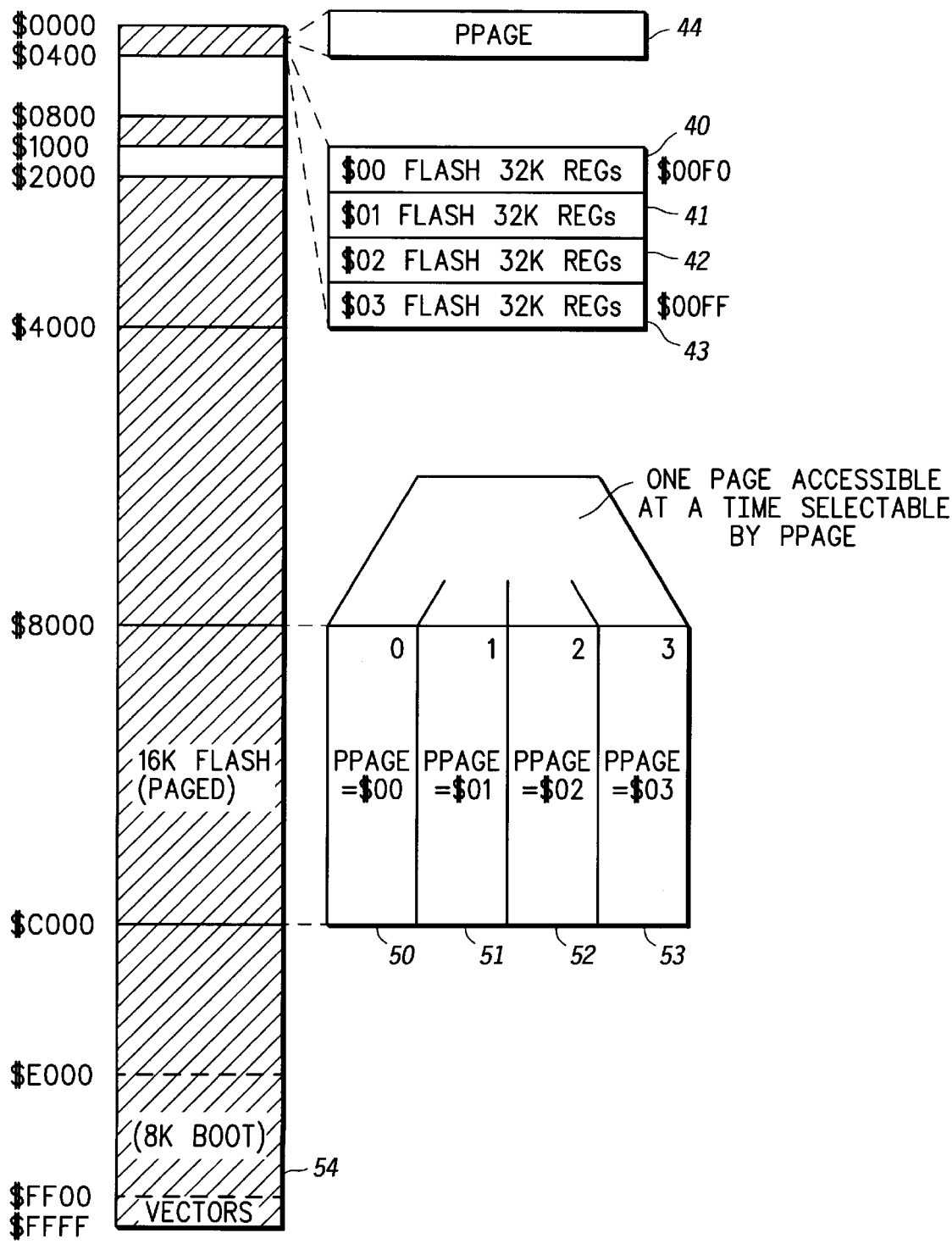
FIG. 3 is a diagram illustrating a page mapping scheme for programmable memory utilized in the prior art.

The programming model is significantly simplified by logically coupling the multiple memory control registers 40, 41, 42, 43 with the corresponding memory arrays 50, 51, 52, 53 as illustrated in FIG. 3. Instead of each memory control register having a unique memory address, memory control registers are overlapped and share a common virtual address. This allows the same mapping control which places a memory array in the CPU map to also place associated block programming registers in the CPU map. Each time a new memory array is selected, the associated block of programming registers is also placed in the virtual memory map. The programming registers are always placed at the same virtual address. To a user, it appears that there is one block of programming registers associated with the entire programmable memory array. This way, a programming algorithm does not need to change each time a new memory array is brought into the memory map.

Figure 5:
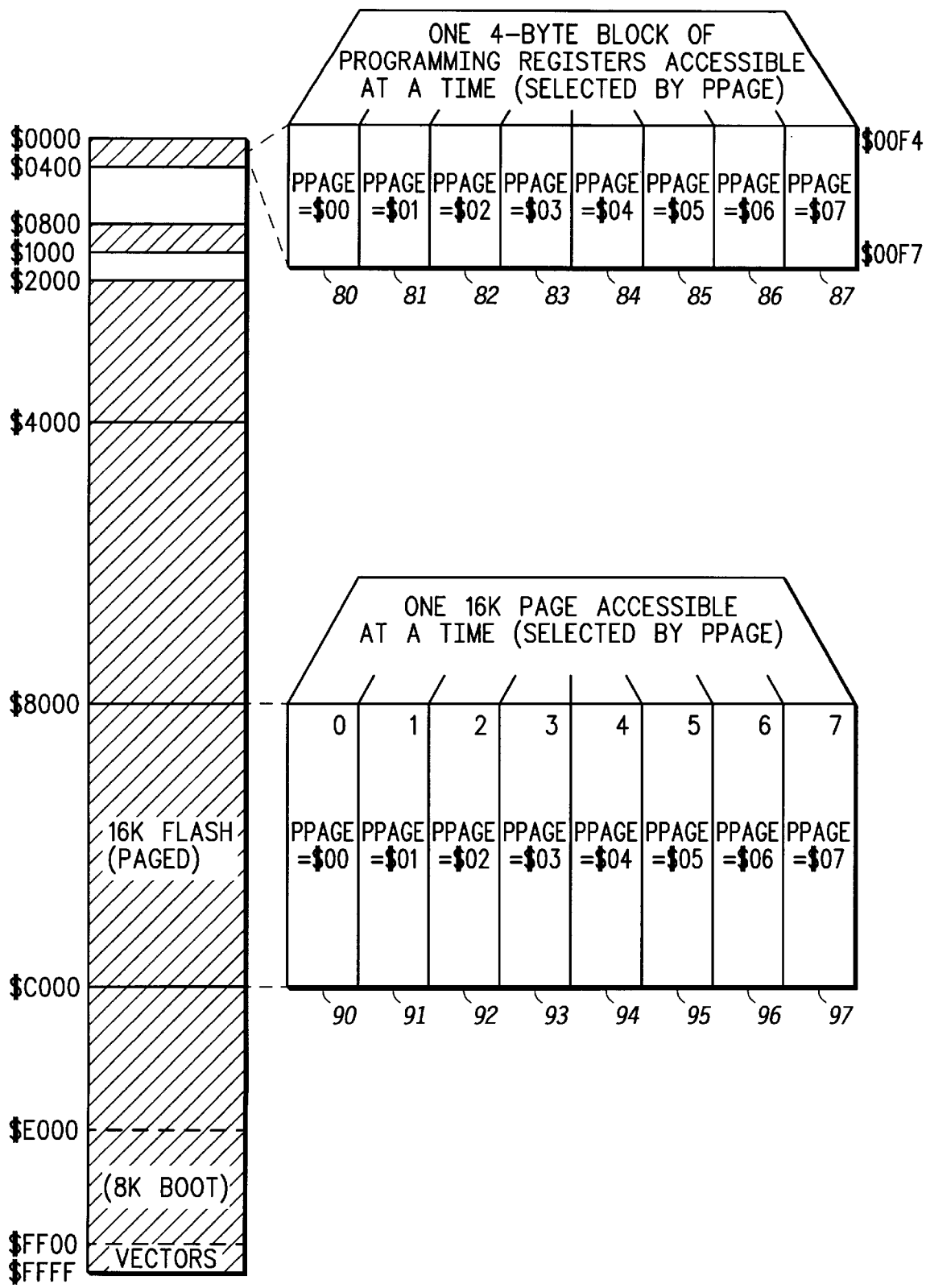
FIG. 5 is a diagram illustrating a memory address map of physical memory and registers for programmable memory in accordance with the present invention.

FIG. 5 is a memory map diagram illustrating the page mapping scheme for programmable memory in accordance with the present invention. Eight memories 90, 91, 92, 93, 94, 95, 96, 97 are shown, each sharing the same virtual memory address window from $8000 through $BFFF. Which of the eight memory pages is visible at any one time is controlled by setting the page selected register (PPAGE) 44 (see FIG. 3) to a value ranging from $00 through $07. Each of the eight memory pages is controlled by a corresponding set of memory registers 80, 81, 82, 83, 84, 85, 86, 87 all overlapped starting at address $00F4 and extending through address $00F7. As with the memory pages, the memory registers are selected by setting the page select register (PPAGE) 44 to values ranging from $00 through $07. Thus, when the page select register (PPAGE) 44 is set to a value of $00, the first page of memory 90 is selected, along with the first page register set 80. Likewise, for the other seven corresponding sets of register sets and memory pages. Note here that eight memory pages and eight corresponding sets of registers are illustrated. However, it is understood that more or fewer memories and corresponding register sets may be implementable with this architecture.

Figure 6:
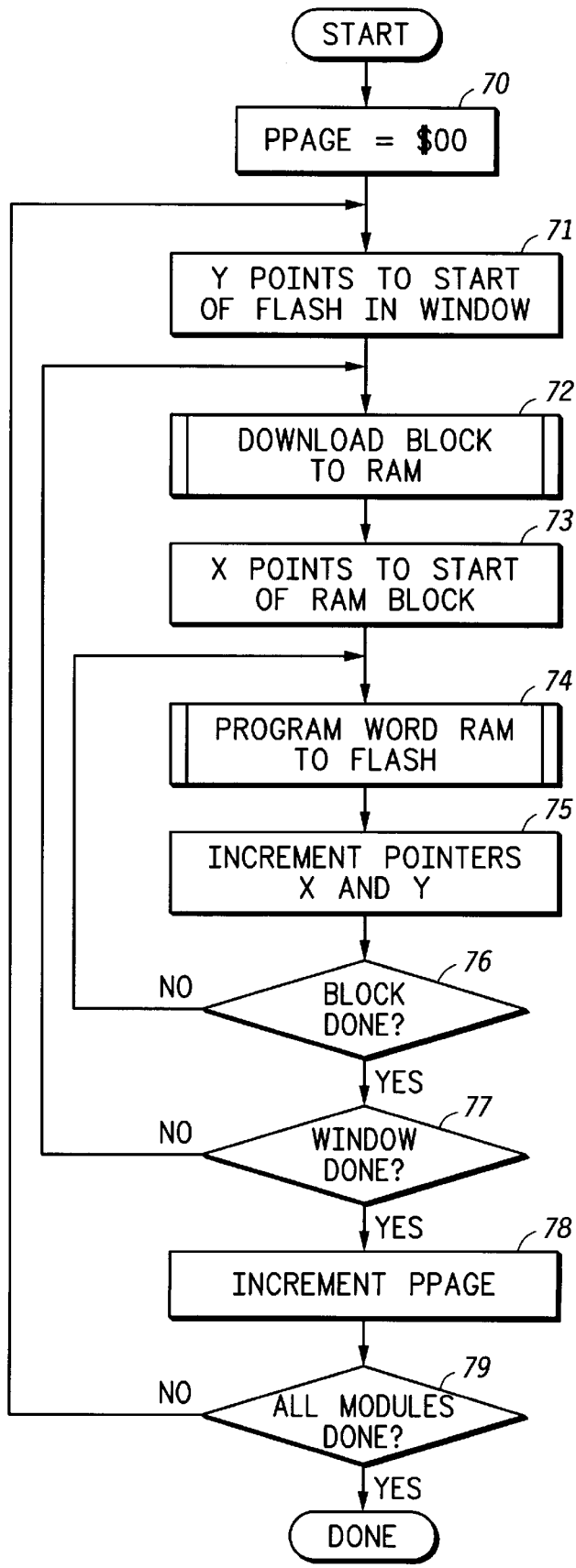
FIG. 6 is a flowchart illustrating memory programming utilizing the page mapping technique illustrated in FIG. 5.

FIG. 6 is a flowchart illustrating memory programming utilizing the page mapping technique illustrated in FIG. 5. The algorithm starts by first setting the page selector register (PPAGE) 44 to a value of $00, step 70. An outer loop is then entered, and a Y register is initialized to point at the start of FLASH memory in the window, step 71. An intermediate loop is then entered, and a block is downloaded to RAM, step 72. This is followed by setting an X register to point at the start of the RAM block, step 73. An inner loop is then entered, starting with programming the word RAM to FLASH, step 74. This utilizes the memory programming registers 80, 81, 82, 83, 84, 85, 86, 87. The X and Y registers are incremented, step 75, and a test is made whether the current block is done, step 76. If the current block is not done, step 76, the inner loop is repeated, starting at step 74. Otherwise, if the block is done, step 76, a test is made whether the current window is done, step 77. If the current window is not done, step 77, the intermediate loop is repeated, starting with step 72. Otherwise, if the current window is done, step 77, the intermediate loop is complete, and the memory page selector register (PPAGE) 44 is incremented, step 78. A test is then made whether all modules or memories have been programmed, step 79. If all modules or memories are not done, step 79, the outer loop is repeated, starting at step 71. Otherwise, if all modules or memories are done, step 79, the programming is complete. Note that significant difference between FIGS. 4 and 6. The outer loop in FIG. 6 is unrolled into four separate pieces of code in FIG. 4 due to the necessity of utilizing different memory programming registers 40, 41, 42, 43 for each memory page programmed or erased. In the case of the present invention, as illustrated in the programming shown in FIG. 6, it is possible to increment the page select register (PPAGE) 44, step 78, while utilizing constant addresses for the memory programming registers, 74.

Figure 7:
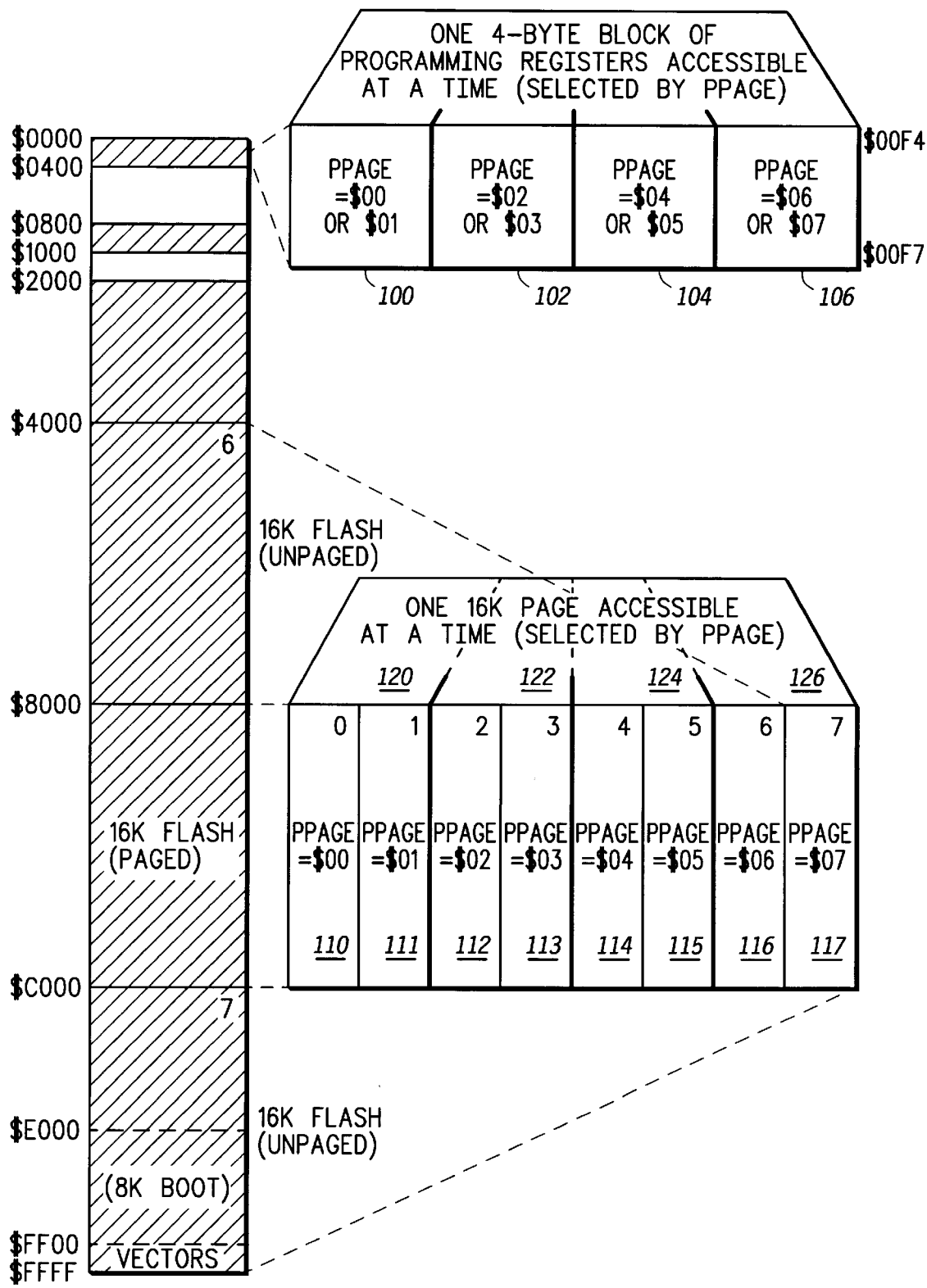
FIGS. 7 through 9 are diagrams illustrating memory address maps of physical memory and registers for alternate embodiments of the invention shown in FIG. 5.

FIG. 7 is a diagram illustrating a memory address map of physical memory and registers for an alternate embodiment of the present invention. As with FIG. 5, eight memory pages are illustrated 110, 111, 112, 113, 114, 115, 116, 117. However, the eight memory pages are physically organized as four memory arrays. In this case, two 16K memory pages make up one 32K memory array. Four memory programming registers 100, 102, 104, 106 are illustrated, corresponding to the four memory arrays 120, 122, 124, 126. The first memory array 120 contains the first memory page 110 selected by a value of $00, and the second memory page 111 selected by a value of $01. Similarly, the second memory array 122 is mapped by the third memory page 112 with a value of $02 and the fourth memory page 113 with a value of $03. Likewise, for the other four memory pages 114, 115, 116, 117 and two memory arrays 124, 126. Thus, a page select register (PPAGE) 44 containing a page selector value equal to $00 selects the first set of programming registers 100, and the first page 110 in the first array 120 of memory. A page selector value of $01 again selects the set of first programming registers 100, but this time selects the second page 111 of the first memory array 120. Similarly, a page selector value equal to $02 selects the second first set of memory programming registers 102, and the first page 112 of the second memory array 122. Likewise, a page selector value equal to $03 selects the second set of memory programming register 102 and the second page 113 of the second memory array 122. This is repeated for the third 104 and fourth 106 sets of memory programming registers and the third 124 and fourth 126 memory arrays.

Flash Page 6 (PPAGE=$06) 116 is additionally mapped from memory addresses $4000 through $7FFF. Likewise, Flash Page 7 (PPAGE=$07) 117 is mapped from $C000 through $FFFF. This allows these two pages to be treated similarly to the other pages of memory when it is necessary to program them, but to additionally have these pages always visible in the physical memory space.

Figure 8:
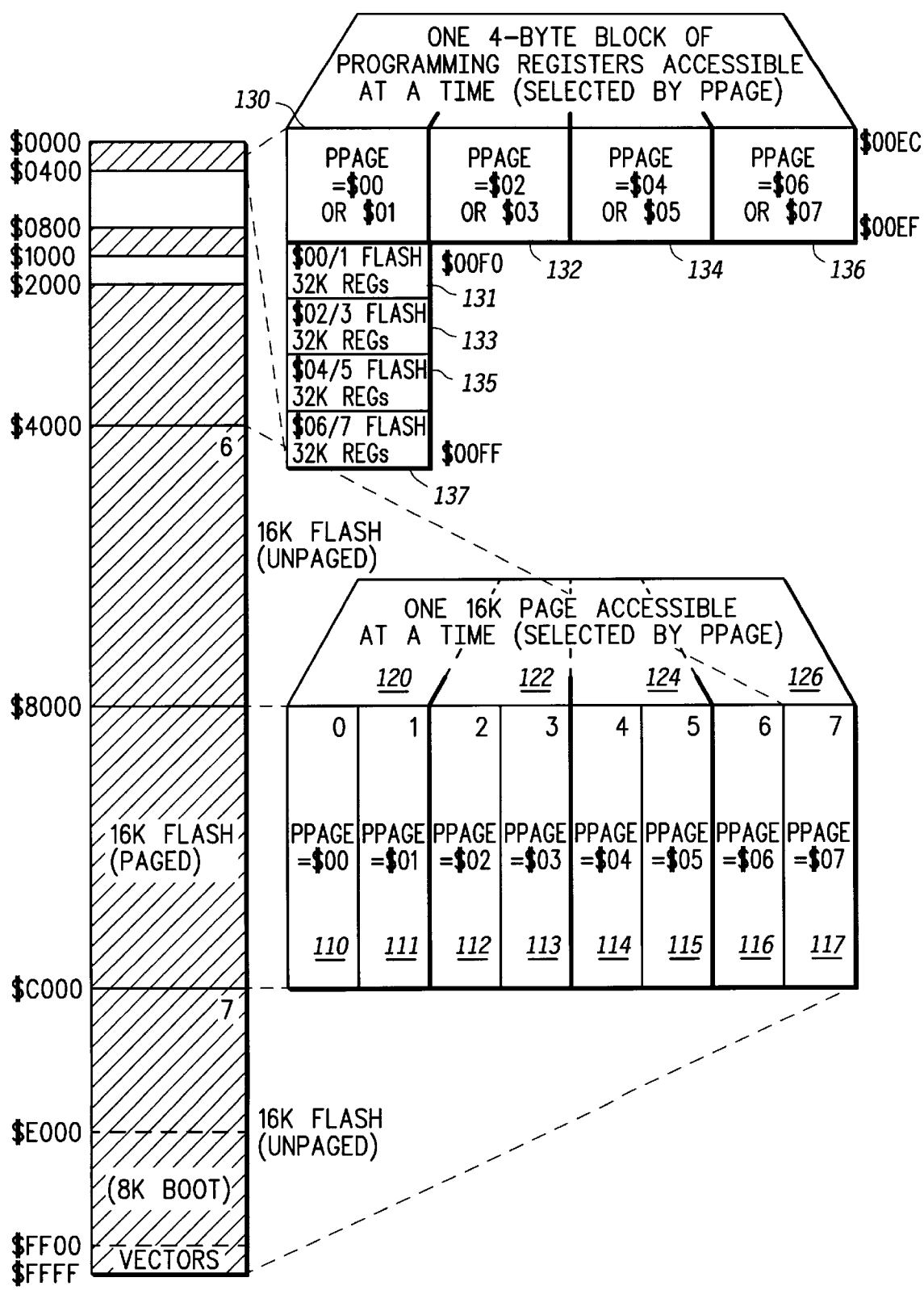

FIG. 8 is a diagram illustrating a memory address map of physical memory and registers for a second alternate embodiment of the present invention. As with FIG. 7, four memory arrays 120, 122, 124, 126 are mapped into eight memory pages 110, 111, 112, 113, 114, 115, 116, 117. Each of the four memory arrays 120, 122, 124, 126 has a corresponding overlapped set of memory registers 130, 132, 134, 136, extending from memory map address $00EC through $00EF. Additionally, each of the four memory arrays 120, 122, 124, 126 has a four byte set of memory registers 131, 133, 135, 137 that are not overlapped, extending from $00F0 through $00FF. The second set of memory programming registers 131, 133, 135, 137 provide constant visibility to one set of programming registers, and overlaid access to the other set 130, 132, 134, 136. Note that in this embodiment, two distinct sets of registers are shown. However, it is possible to implement them as overlapped. Thus, the first non-overlaid register 131 may address the overlaid register 130 selected with PPAGE=$00.

Figure 9:
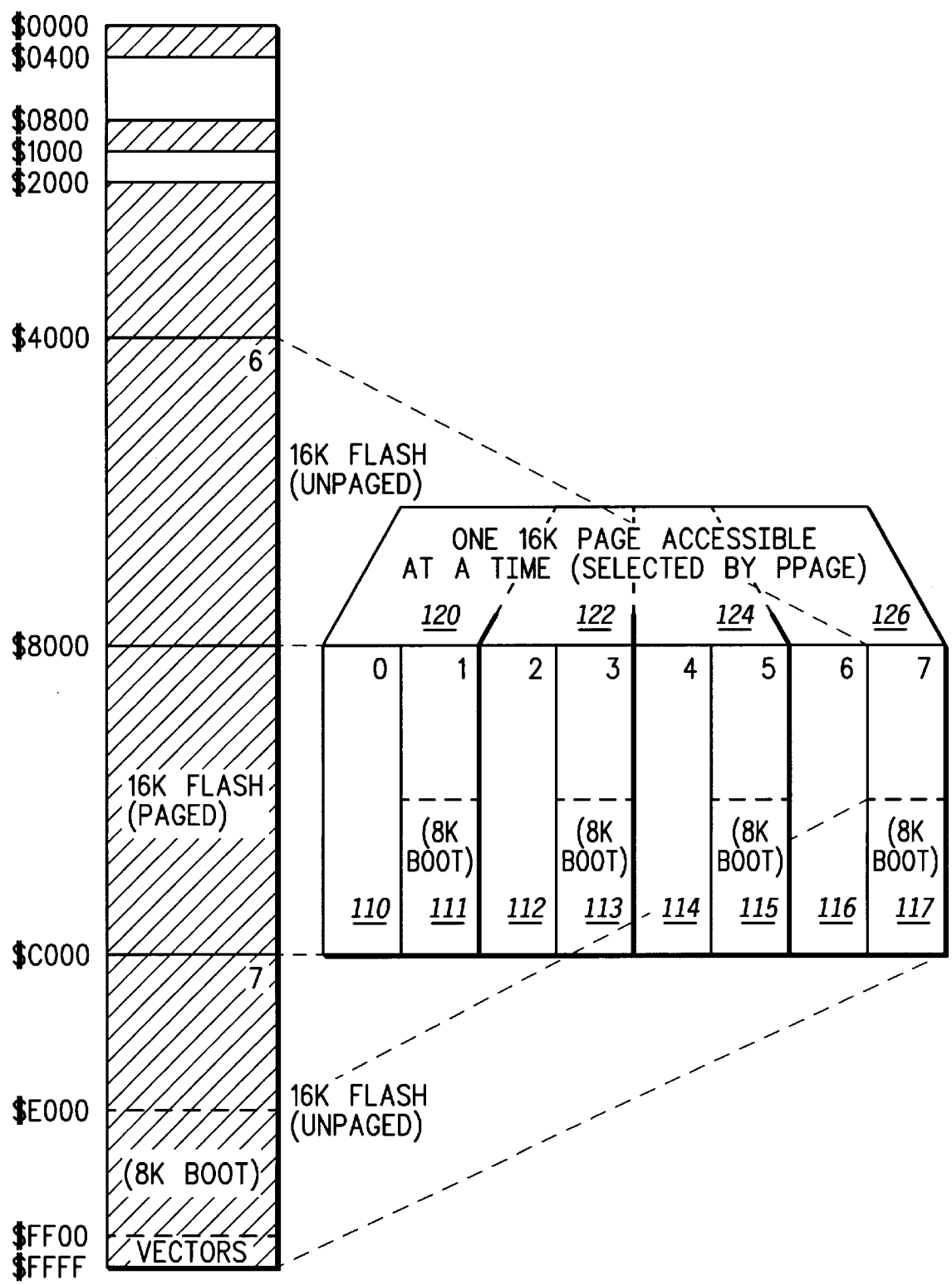

FIG. 9 is a diagram illustrating a memory address map of physical memory and registers for another alternate embodiment of the present invention. This FIG. 9 only illustrates the memory arrays and memory pages, as shown in FIG. 7. An 8K boot section for each of the memory arrays 120, 122, 124, 126 can be controlled from the corresponding memory registers 100, 102, 104, 106. The BOOTP bit in the FEEMCR register (see below) allows this boot area to be locked out from erasing and programming. The boot section in the fourth memory array 126, and in the eighth page 117 is mapped into the system boot area and interrupt and reset vector area extending from $E000 through $FFFF in the system memory page. It is expected that the BOOTP bit will be used to protect this area of memory.

Table T-1 illustrates the contents of the memory control registers 80, 81, 82, 83, 84, 85, 86, 87 shown in FIG. 5. The table is followed by a more detailed description of the register bits for the registers shown in Table T-1. Note that the bits shown in the table are for illustrative purposes and it is understood that other embodiments of this invention may utilize other register configurations.

TABLE T-1

Memory Register Layout

| Addr: | $00F4 | $00F5 | $00F6 | $00F7 |
|---|---|---|---|---|
| Name: | FEELCK | FEEMCR | FEETST | FEECTL |
| Bit 0 | LOCK | BOOTP | MWPR | ENPE |
| Bit 1 | 0 | 0 | STRE | LAT |
| Bit 2 | 0 | 0 | VTCK | ERAS |
| Bit 3 | 0 | 0 | FDISVFP | SVFP |
| Bit 4 | 0 | 0 | FENLV | FEESWAI |
| Bit 5 | 0 | 0 | HVT | 0 |
| Bit 6 | 0 | 0 | GADR | 0 |
| Bit 7 | 0 | 0 | FSTE | 0 |

FEELCK ($00F4) - Flash EEPROM Lock Control Register:
    LOCK (Bit 0) - Lock Register Bit
        Enable/Disable write to FEEMCR register
FEEMCR ($00F5) - Flash EEPROM Module Test Register:
    BOOTP (Bit 0) - Boot Protect
        Enable/Disable boot block erase/program
FEETST ($00F6) - Flash EEPROM Module Test Register:
    MWPR (Bit 0) - Multiple Word Programming
        Enable/Disable multiple (32) word programming
    STRE (Bit 1) - Spare Row Enable
        Enable/Disable are test row
    VTCK (Bit 2) - $V_T$ Check Test Enable
        Enable/Disable $V_T$ test using $V_{FP}$ pin
    FDISVFP (Bit 3) - Disable Status $V_{FP}$ Voltage Lock
        Enable/Disable automatic LAT lock for low $V_{FP}$
    FENLV (Bit 4) - Enable Low Voltage
        Enable/Disable low voltage transistor in ref. circuit
    HVT (Bit 5) - Stress Test High Voltage Level
        Presence or absence of high voltage during stress test
    GADR (Bit 6) - Gate/Drain Stress Test Select
        Selects gate or drain stress test circuitry
    FSTE (Bit 7) - Stress Test Enable
        Enable/Disable gate/drain stress test circuitry
FEECTL ($00F7) - Flash EEPROM Control Register:
    ENPE (Bit 0) - Enable Programming/Erase
        Enable/Disable program/erase voltage to Flash
    LAT (Bit 1) - Latch Control
        Enable/Disable programming latches

TABLE T-1-continued

ERAS (Bit 2) - Erase Control
    Flash configured for Programming/Erasure
SVFP (Bit 3) - Status $V_{FP}$ Voltage
    $V_{FP}$ pin above/below normal programming levels
FEESWAI (Bit 4) - Flash EEPROM Stop In Wait Control
    Enable/Disable halt when in wait mode Table T-2 lists the effects of the ENPE, LAT, and ERAS bits on memory array reads:

TABLE T-2

Effect of ENPE, LAT, and ERAS on Array Reads

| ENPE | LAT | ERAS | Result of Read |
|---|---|---|---|
| 0 | 0 | — | Normal read of location addressed |
| 0 | 1 | 0 | Read of location being programmed |
| 0 | 1 | 1 | Normal read of location addressed |
| 1 | — | — | Read cycle ignored |

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A data processing system comprising:

a page selector;

a first memory and a second memory sharing a first common address space map;

a first set of memory control registers and a second set of memory control registers sharing a second common address space map which appears in a programming model as a virtual set of memory control registers;

a third memory and a fourth memory sharing the first common address space wherein:

the first memory and the first set of memory control registers are selected when the page selector has a first value, the second memory and the second set of memory control registers are selected when the page selector has a second value, the third memory and the first set of memory control registers are selected when the page selector has a third value, and the fourth memory and the second set of memory control registers are selected when the page selector has a fourth value.

2. A data processing system comprising:

a page selector;

a first memory and a second memory sharing a first common address space map; and a first set of memory control registers and a second set of memory control registers sharing a second common address space map which appears in a programming model as a virtual set of memory control registers;

wherein:

the first memory and the first set of memory control registers are selected when the page selector has a first value, the second memory and the second set of memory control registers are selected when the page selector has a second value, and the page selector is a one byte page select register.

3. A data processing system comprising:

a page selector;

a first memory and a second memory sharing a first common address space map; and a first set of memory control registers and a second set of memory control registers sharing a second common address space map which appears in a programming model as a virtual set of memory control registers;

wherein:

the first memory and the first set of memory control registers are selected when the page selector has a first value, the second memory and the second set of memory control registers are selected when the page selector has a second value, and the first set of memory control registers and the second set of memory control registers are each four bytes in size.

4. A data processing system comprising:

a page selector;

a first memory and a second memory sharing a first common address space map; and a first set of memory control registers and a second set of memory control registers sharing a second common address space map which appears in a programming model as a virtual set of memory control registers;

wherein:

the first memory and the first set of memory control registers are selected when the page selector has a first value, the second memory and the second set of memory control registers are selected when the page selector has a second value, and the first set of memory control registers is memory mapped to a third address space map.

5. A method of programming/erasing a plurality of memories comprising:

A) initializing a page selector to an initial value;

B) programming a selected set of memory control registers selected from a plurality of sets of memory control registers by the page selector;

C) programming/erasing a selected memory page selected from a plurality of memory pages by the page selector;

D) setting the page selector to an other value; and

E) repeating steps (B), (C), and (D) while more pages in the plurality of memory pages are to be programmed/erased, wherein:

each of the plurality of memory pages is mapped in a first common address space window, each of the plurality of sets of memory control registers is mapped in a second common address space window which appears in a programming model as a virtual set of memory control registers, each of the plurality of memory pages corresponds to one of the plurality of sets of memory control registers, a first plurality of the plurality of memory pages corresponds to a first one of the plurality of sets of memory control registers, and a second plurality of the plurality of memory pages distinct from the first plurality of the plurality of memory pages corresponds to a second one of the plurality of sets of memory control registers.

6. A method of programming/erasing a plurality of memories comprising:

A) initializing a page selector to an initial value;

B) programming a selected set of memory control registers selected from a plurality of sets of memory control registers by the page selector;

C) programming/erasing a selected memory page selected from a plurality of memory pages by the page selector;

D) setting the page selector to an other value; and

E) repeating steps (B), (C), and (D) while more pages in the plurality of memory pages are to be programmed/erased, wherein:

each of the plurality of memory pages is mapped in a first common address space window, each of the plurality of sets of memory control registers is mapped in a second common address space window which appears in a programming model as a virtual set of memory control registers, each of the plurality of memory pages corresponds to one of the plurality of sets of memory control registers, and each of the plurality of sets of memory control registers corresponds to a distinct one of the plurality of memory pages.

7. A data processing system comprising:

a processor;

a page select register;

a memory management interface coupled to the processor and controlled by the page select register;

a first memory and a second memory coupled to the memory management interface, wherein:

a first page of the first memory and a first page of the second memory appear to the processor as a virtual memory page; and a first set of memory control registers and a second set of memory control registers that appear to the processor as a virtual set of memory control registers;

wherein:

the first page of the first memory is visible to the processor as the virtual memory page and the first set of memory control registers is visible to the processor as the virtual set of memory control registers when the page select register has a first value, the first page of the second memory is visible to the processor as the virtual memory page and the second set of memory control registers is visible to the processor as the virtual set of memory control registers when the page select register has a second value, the page select register is a one byte register;

the first set of memory control registers, the second set of memory control registers, and the virtual set of memory control registers are each four bytes in size, the first memory and the second memory are FLASH memory, and each of the first page of the first memory, the first page of the second memory, and the virtual memory page are 16 k byte pages.

8. A data processing system comprising:

a processor;

a page select register;

a memory management interface coupled to the processor and controlled by the page select register;

a first memory and a second memory coupled to the memory management interface, wherein:

a first page of the first memory and a first page of the second memory appear to the processor as a virtual memory page; and a first set of memory control registers and a second set of memory control registers that appear to the processor as a virtual set of memory control registers;

wherein:

the first page of the first memory is visible to the processor as the virtual memory page and the first set of memory control registers is visible to the processor as the virtual set of memory control registers when the page select register has a first value, the first page of the second memory is visible to the processor as the virtual memory page and the second set of memory control registers is visible to the processor as the virtual set of memory control registers when the page select register has a second value, a second page of the first memory and a second page of the second memory appear to the processor as the virtual memory page;

the second page of the first memory is visible to the processor as the virtual memory page and the first set of memory control registers is visible to the processor as the virtual set of memory control registers when the page select register has a third value, and the second page of the second memory is visible to the processor as the virtual memory page and the second set of memory control registers is visible to the processor as the virtual set of memory control registers when the page select register has a fourth value.

9. A data processing system comprising:

a processor;

a page select register;

a memory management interface coupled to the processor and controlled by the page select register;

a first memory and a second memory coupled to the memory management interface, wherein:

a first page of the first memory and a first page of the second memory appear to the processor as a virtual memory page; and a first set of memory control registers and a second set of memory control registers that appear to the processor as a virtual set of memory control registers;

wherein:

the first page of the first memory is visible to the processor as the virtual memory page and the first set of memory control registers is visible to the processor as the virtual set of memory control registers when the page select register has a first value, the first page of the second memory is visible to the processor as the virtual memory page and the second set of memory control registers is visible to the processor as the virtual set of memory control registers when the page select register has a second value, and the first page of the first memory is also visible to the processor as a second virtual memory page mapped separately from the virtual memory page.

* * * * *